Oct. 11, 1949.  W. T. MacCREADIE  2,484,178
WIRE ROPE MAKING MACHINE
Filed Sept. 25, 1945  12 Sheets-Sheet 1
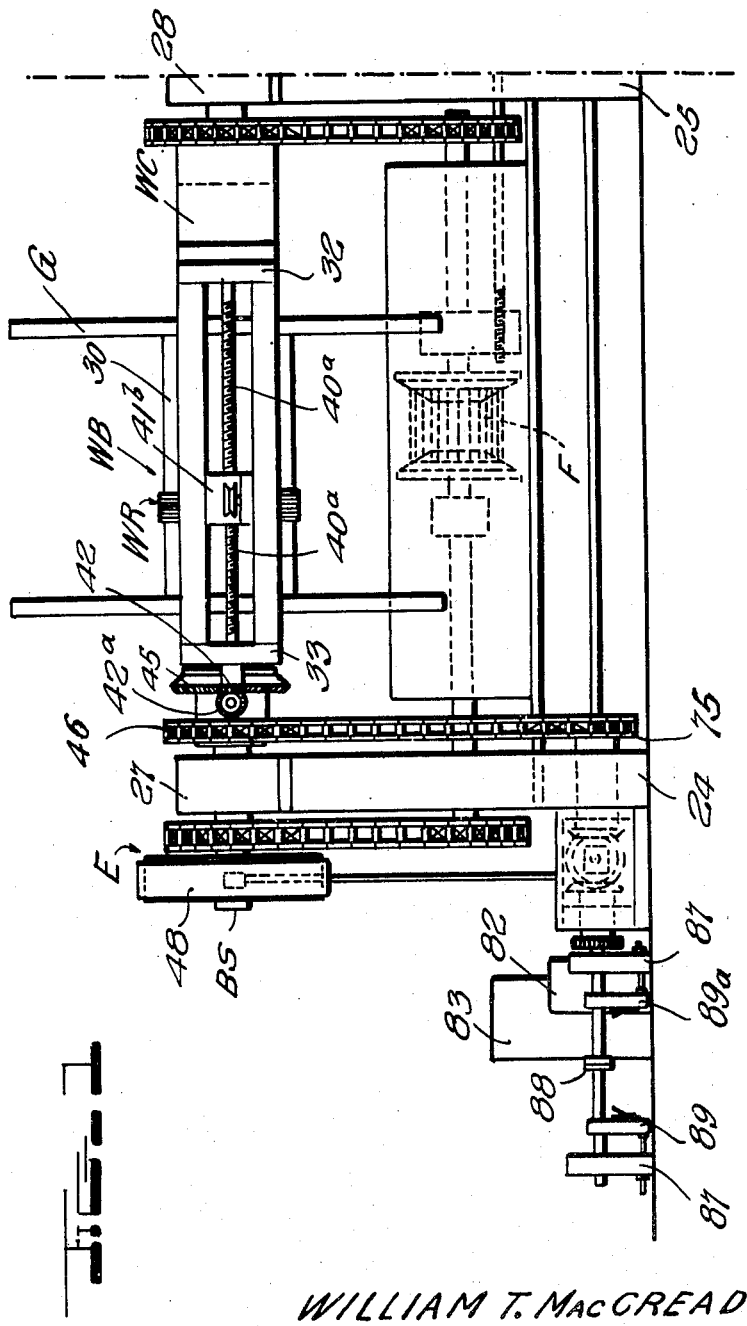
Inventor
WILLIAM T. MacCREADIE,
By Wm. S. Hodges
Attorney

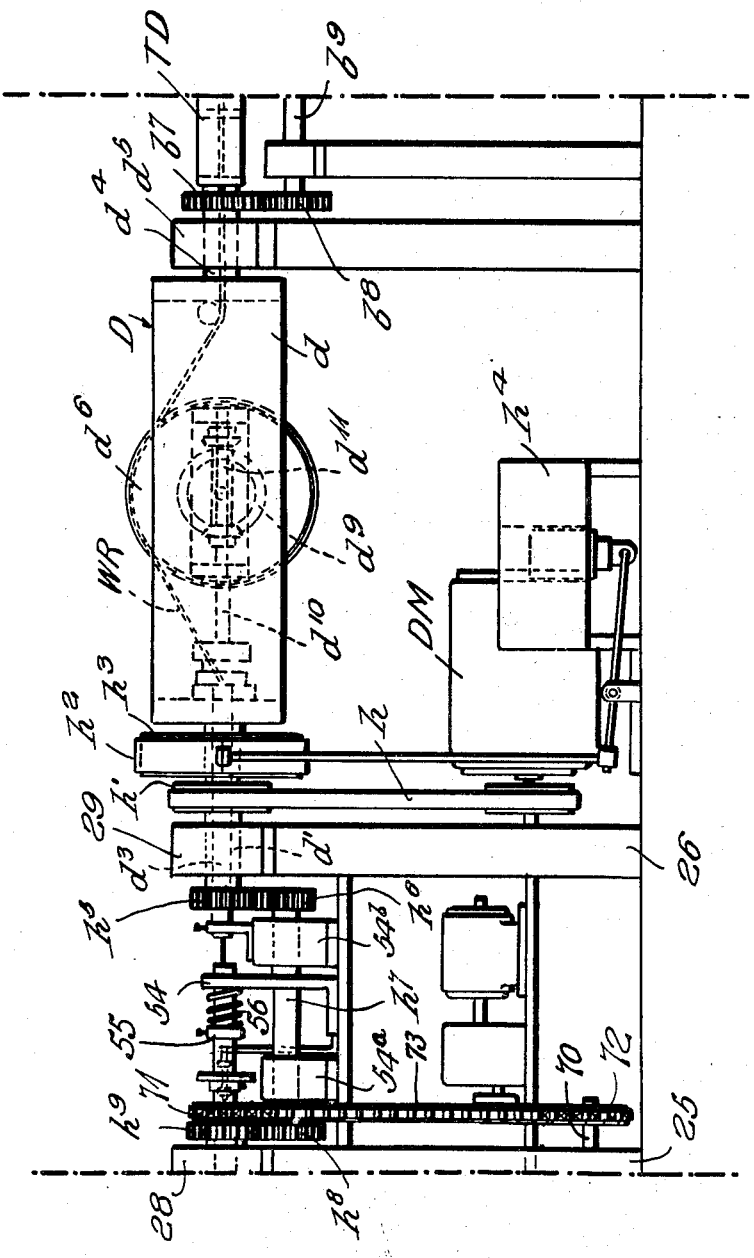

Oct. 11, 1949.  W. T. MacCREADIE  2,484,178
WIRE ROPE MAKING MACHINE
Filed Sept. 25, 1945  12 Sheets-Sheet 3
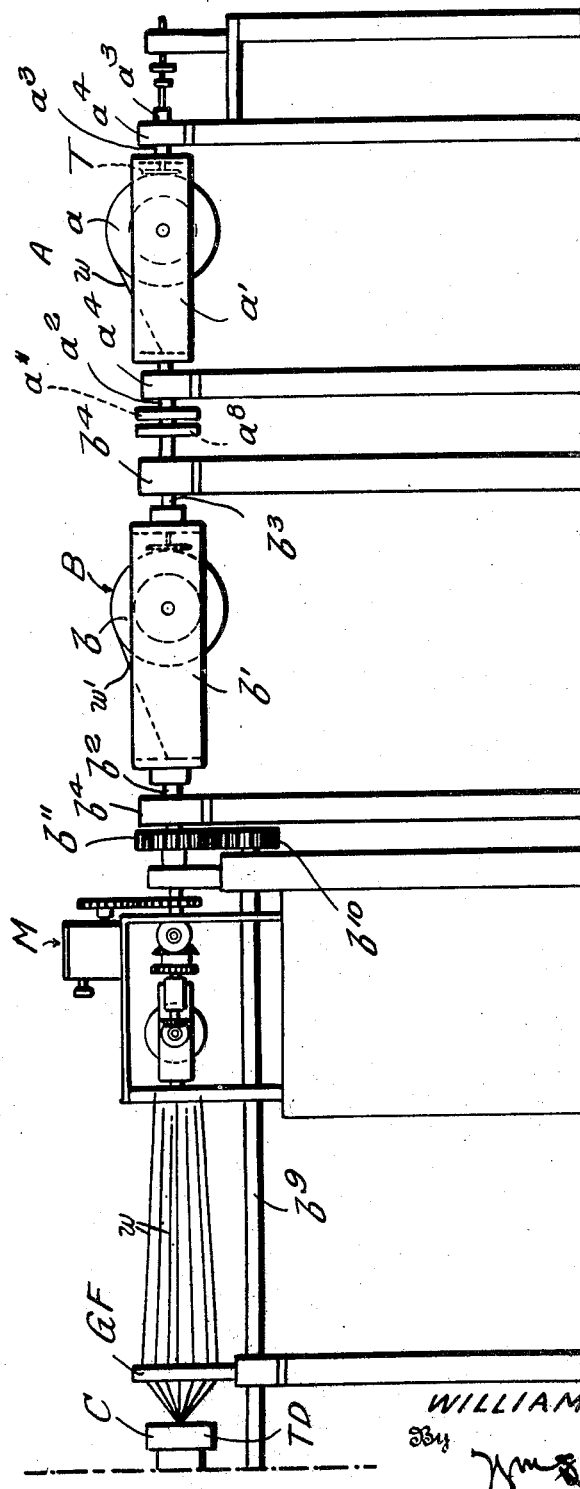
Inventor
WILLIAM T. MacGREADIE,
By
Attorney

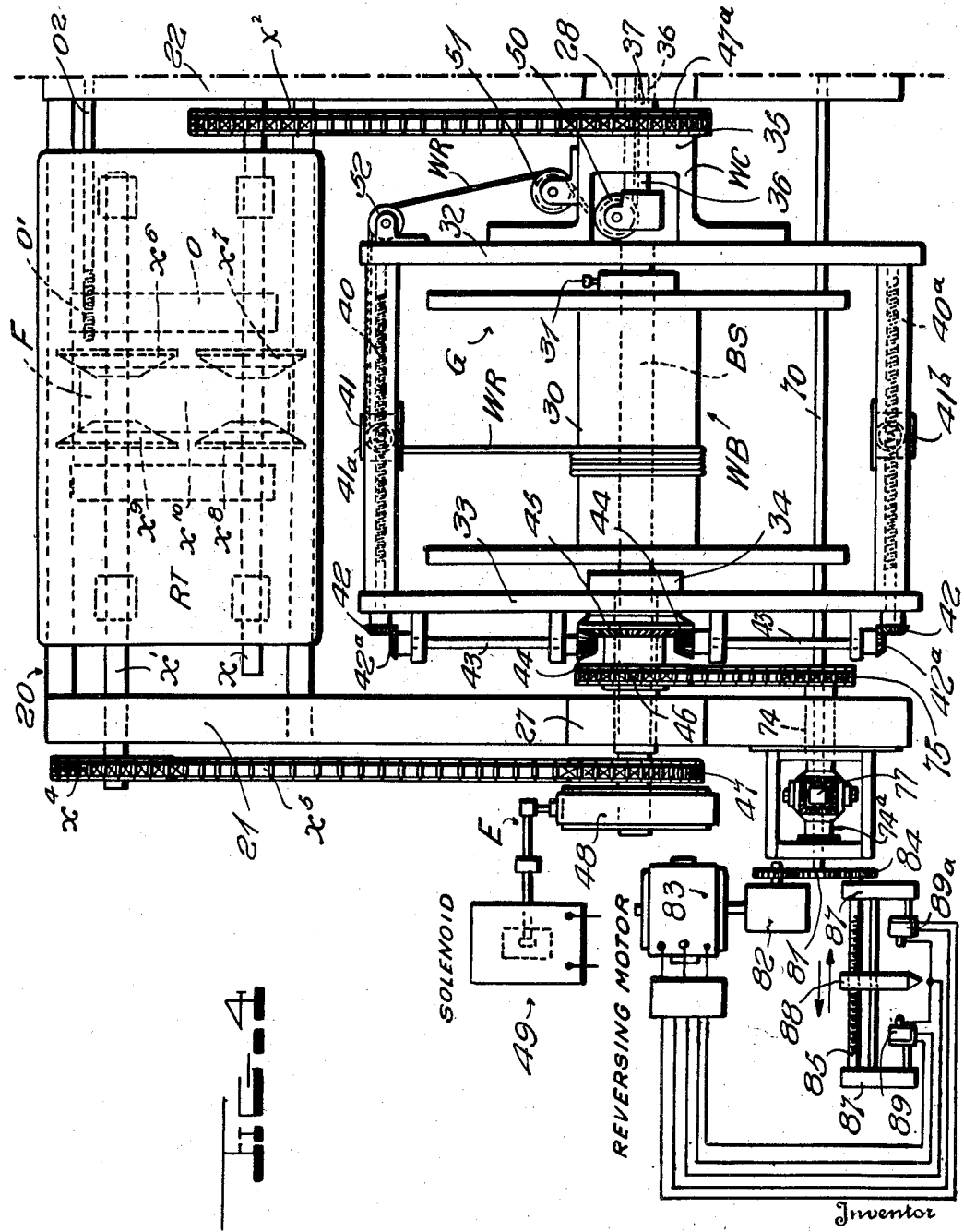

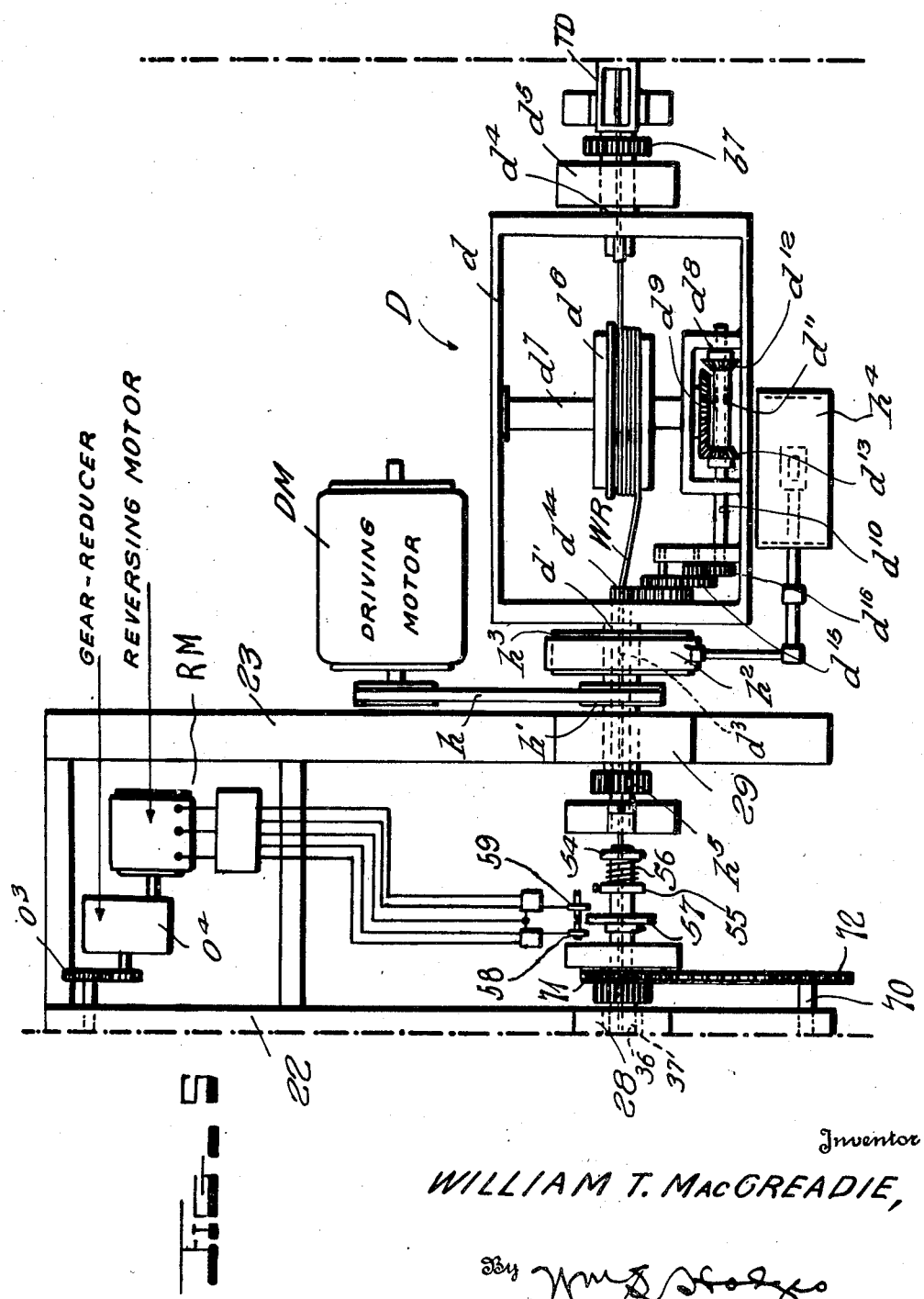

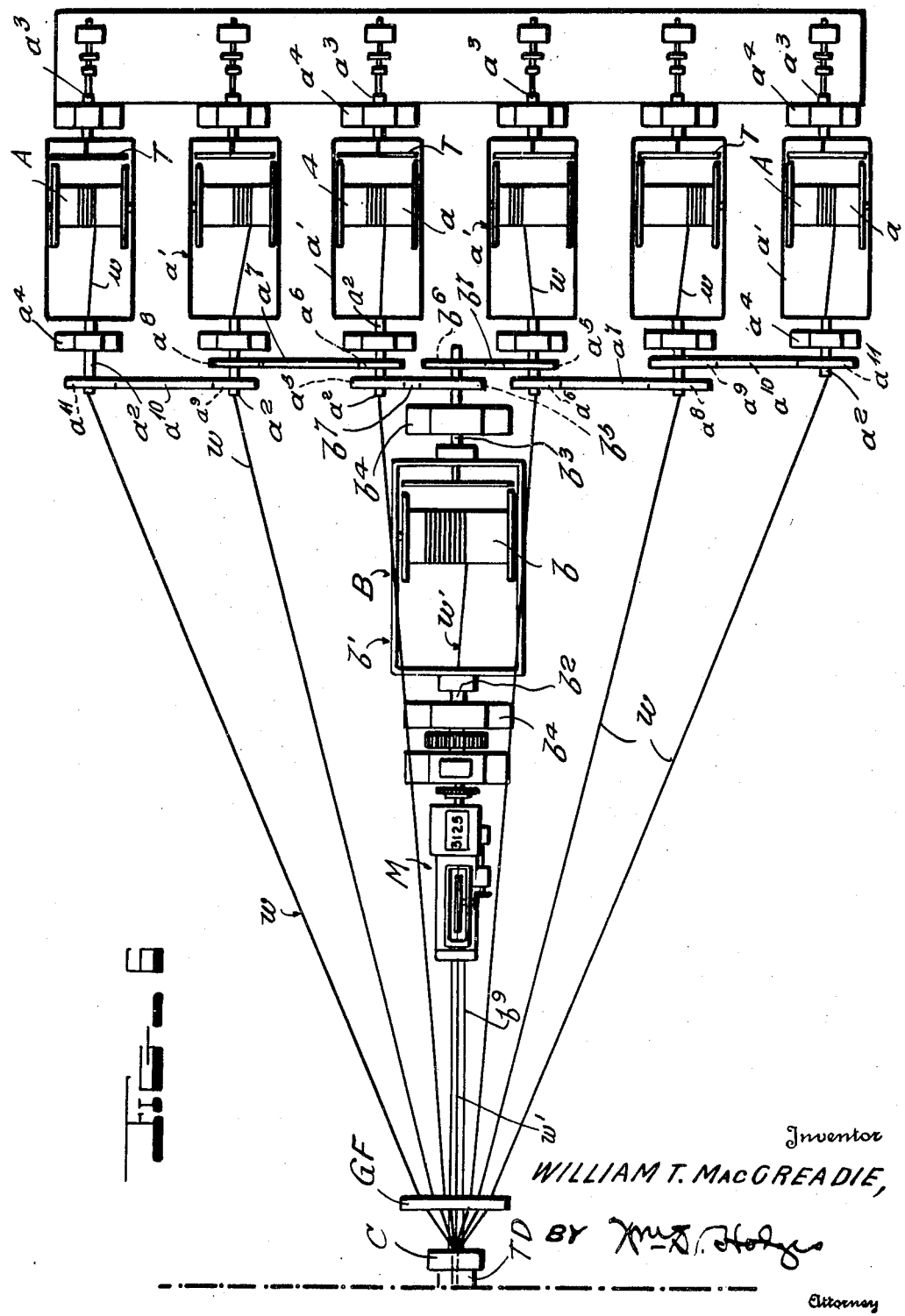

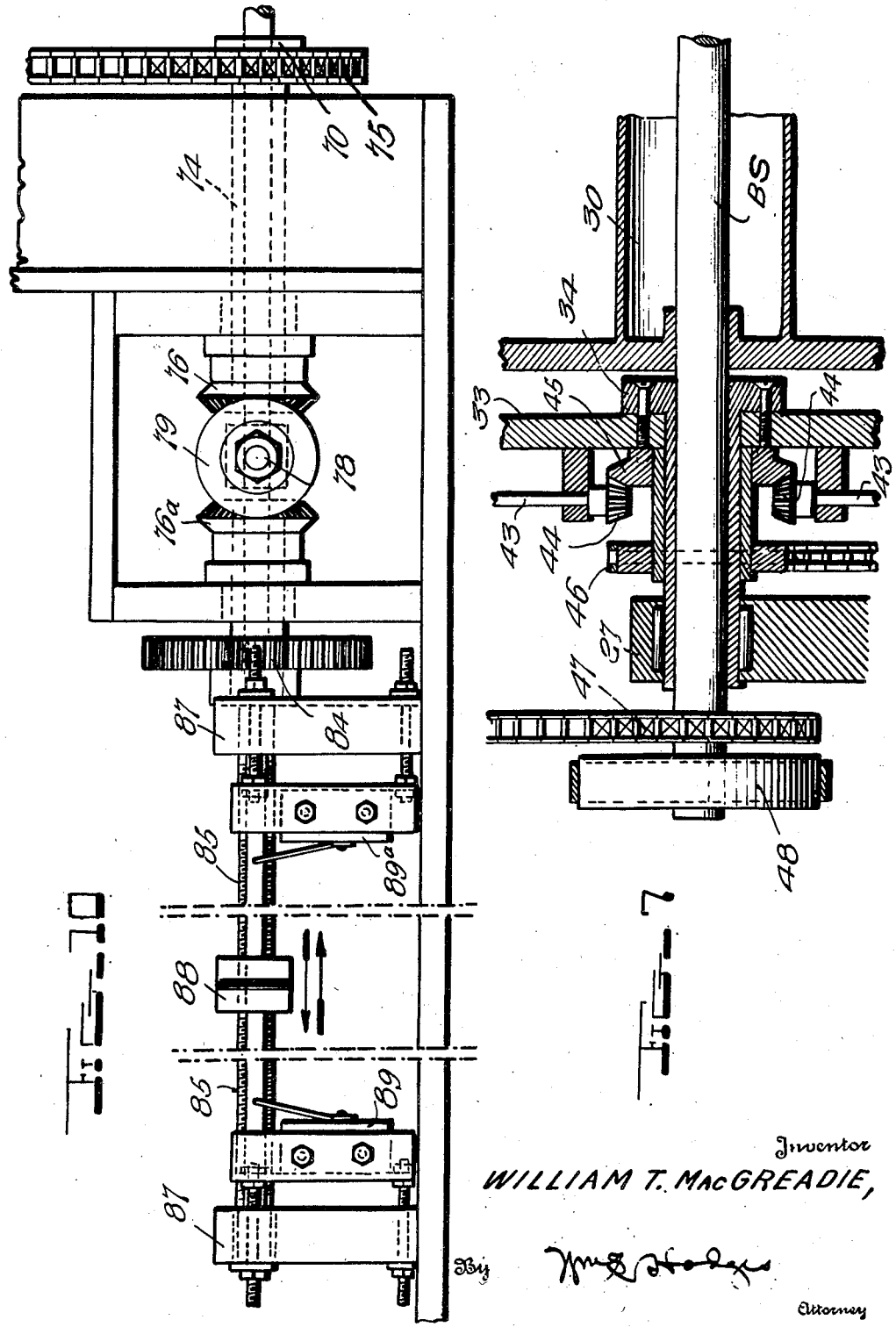

Oct. 11, 1949.　　　W. T. MacCREADIE　　　2,484,178
WIRE ROPE MAKING MACHINE
Filed Sept. 25, 1945　　　　　　　　　　　　12 Sheets-Sheet 8
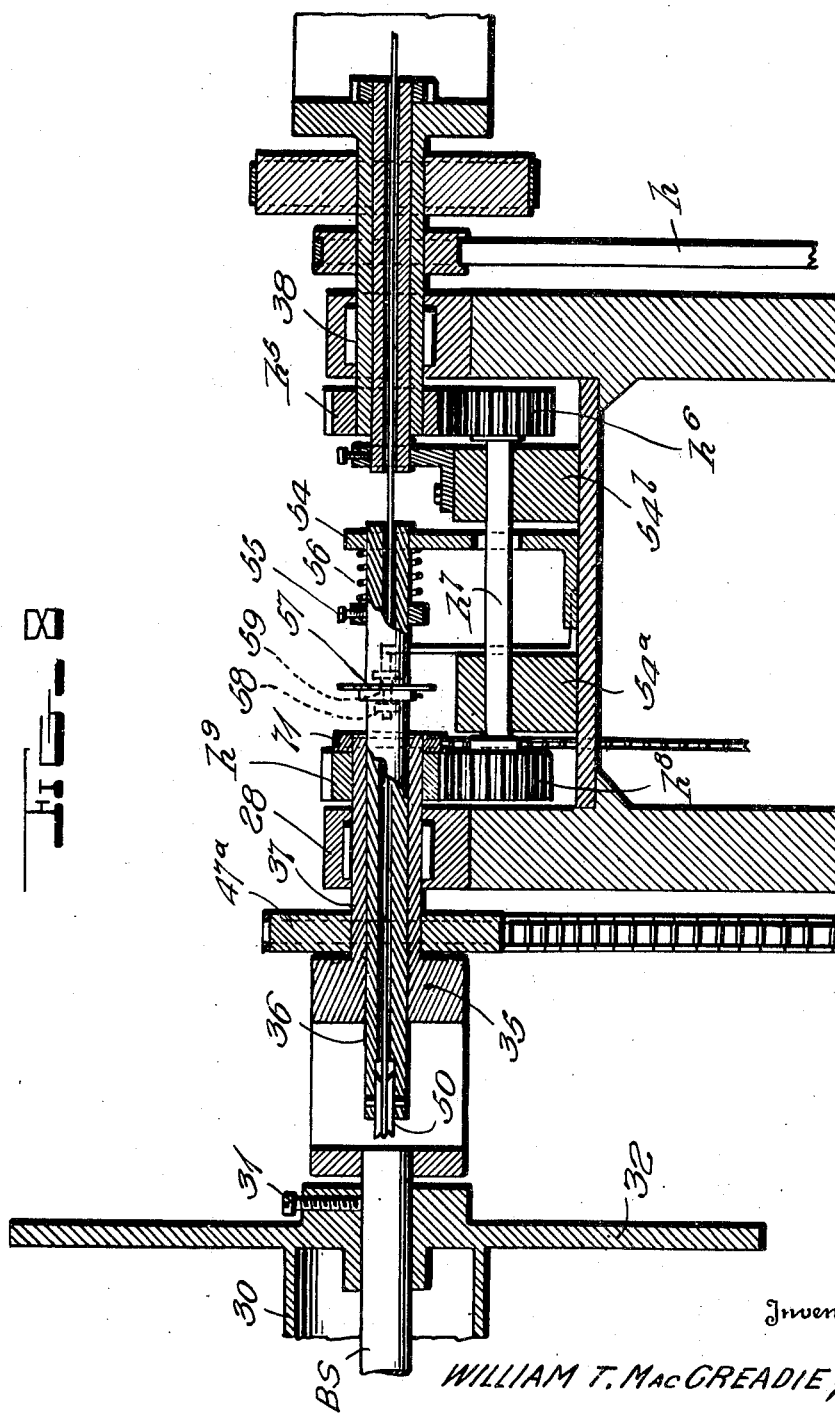
Inventor
WILLIAM T. MacCREADIE,
By　　　Attorney

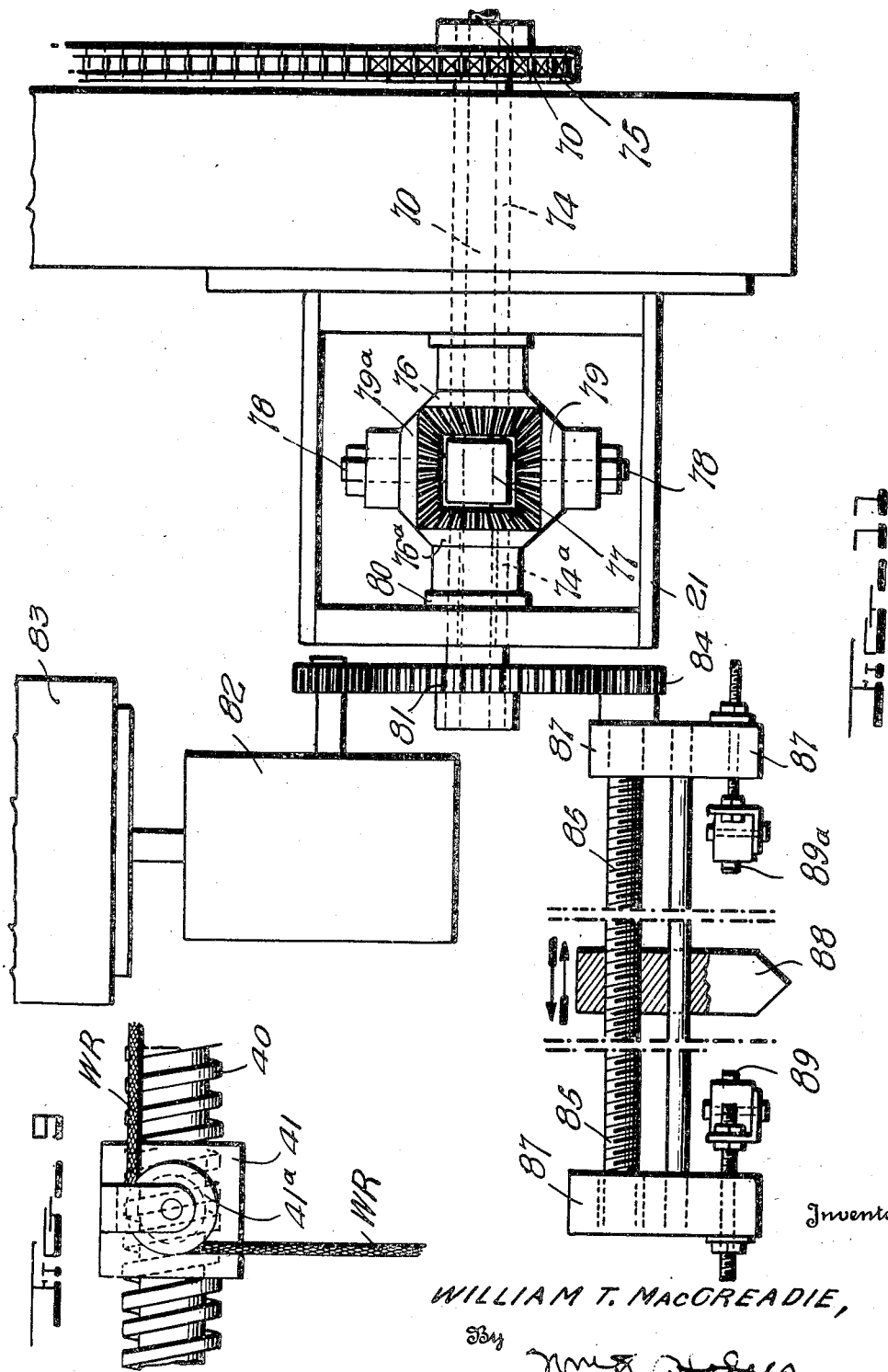

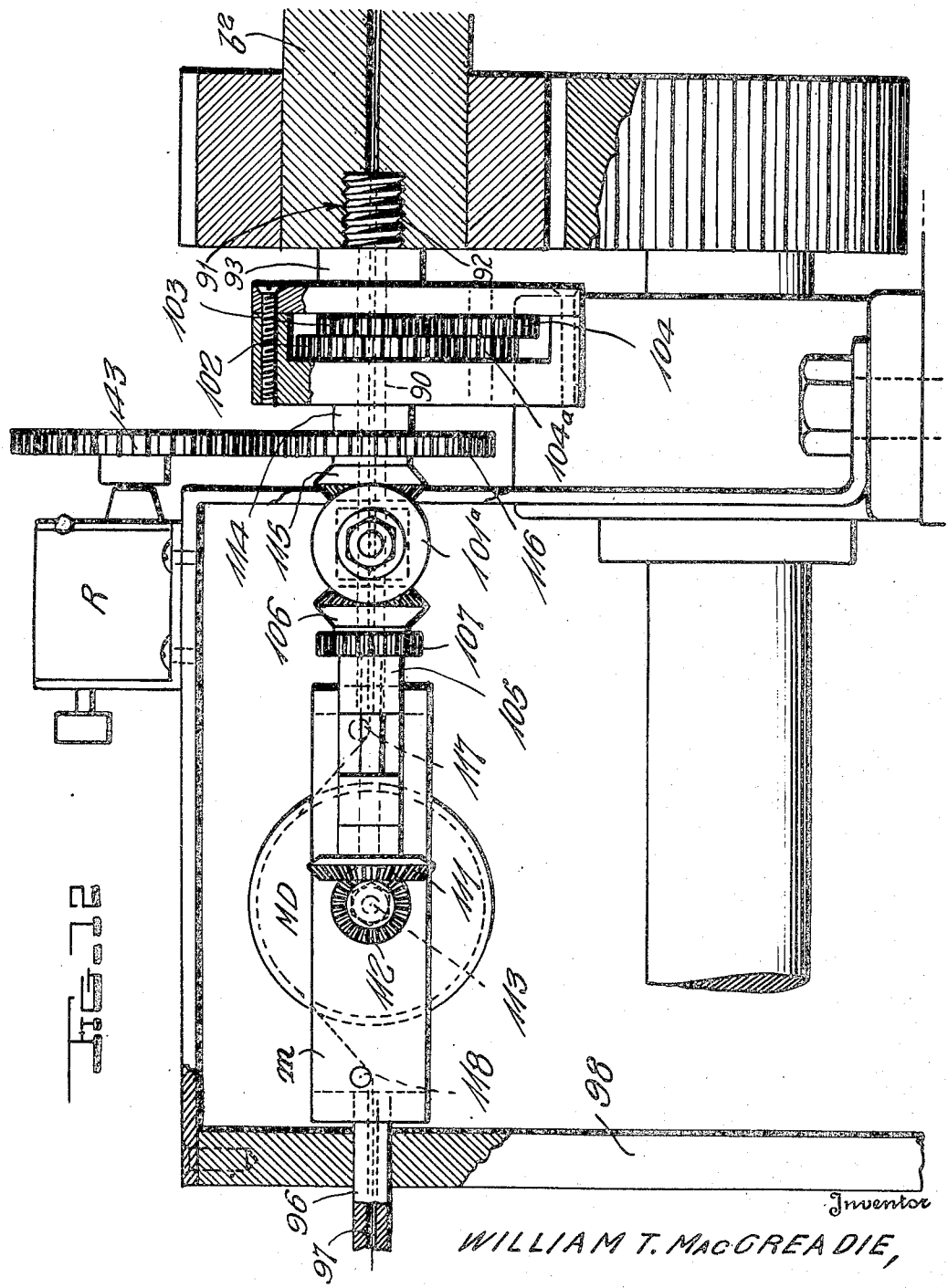

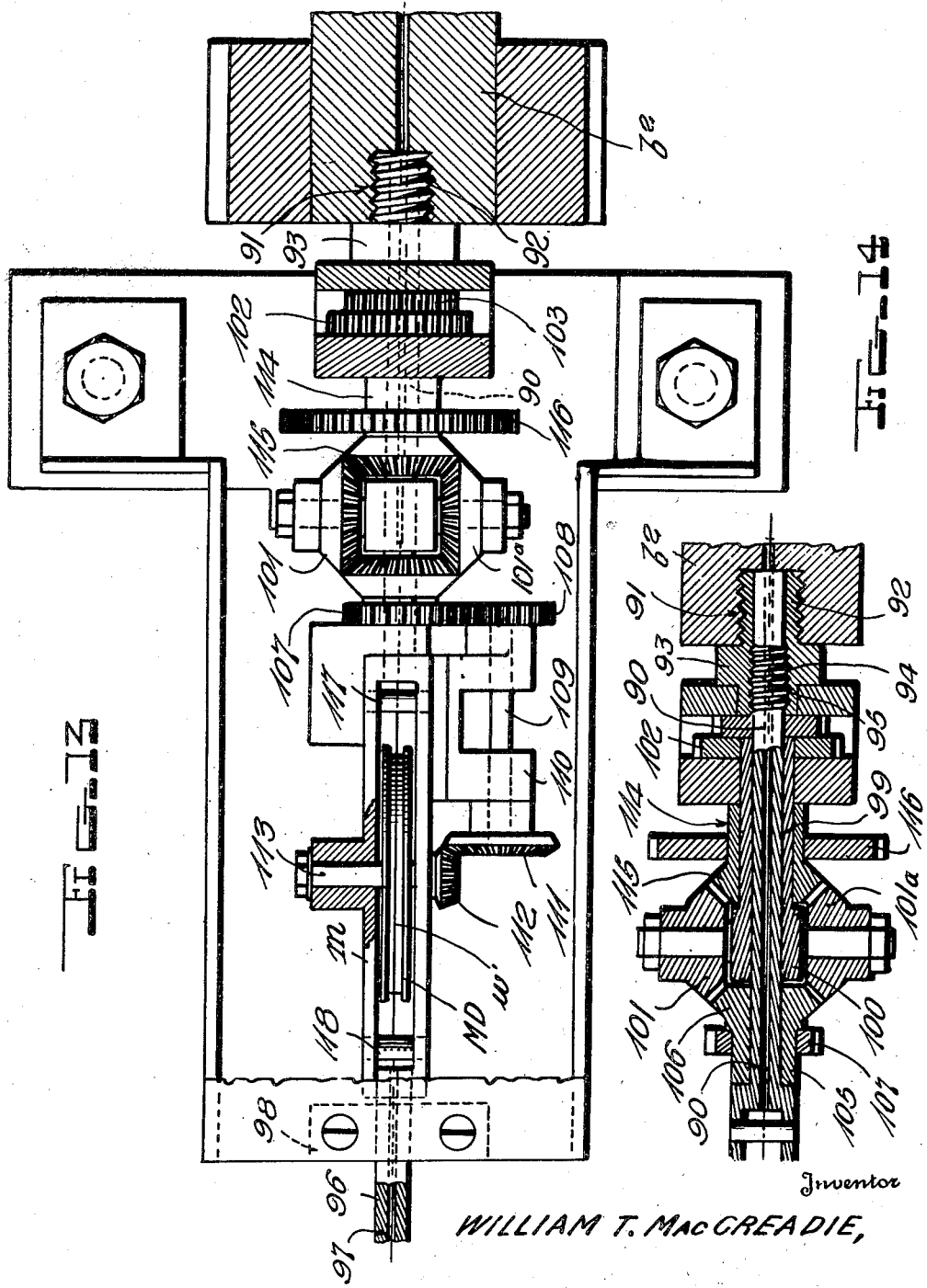

Oct. 11, 1949.  W. T. MacCREADIE  2,484,178
WIRE ROPE MAKING MACHINE
Filed Sept. 25, 1945  12 Sheets-Sheet 12
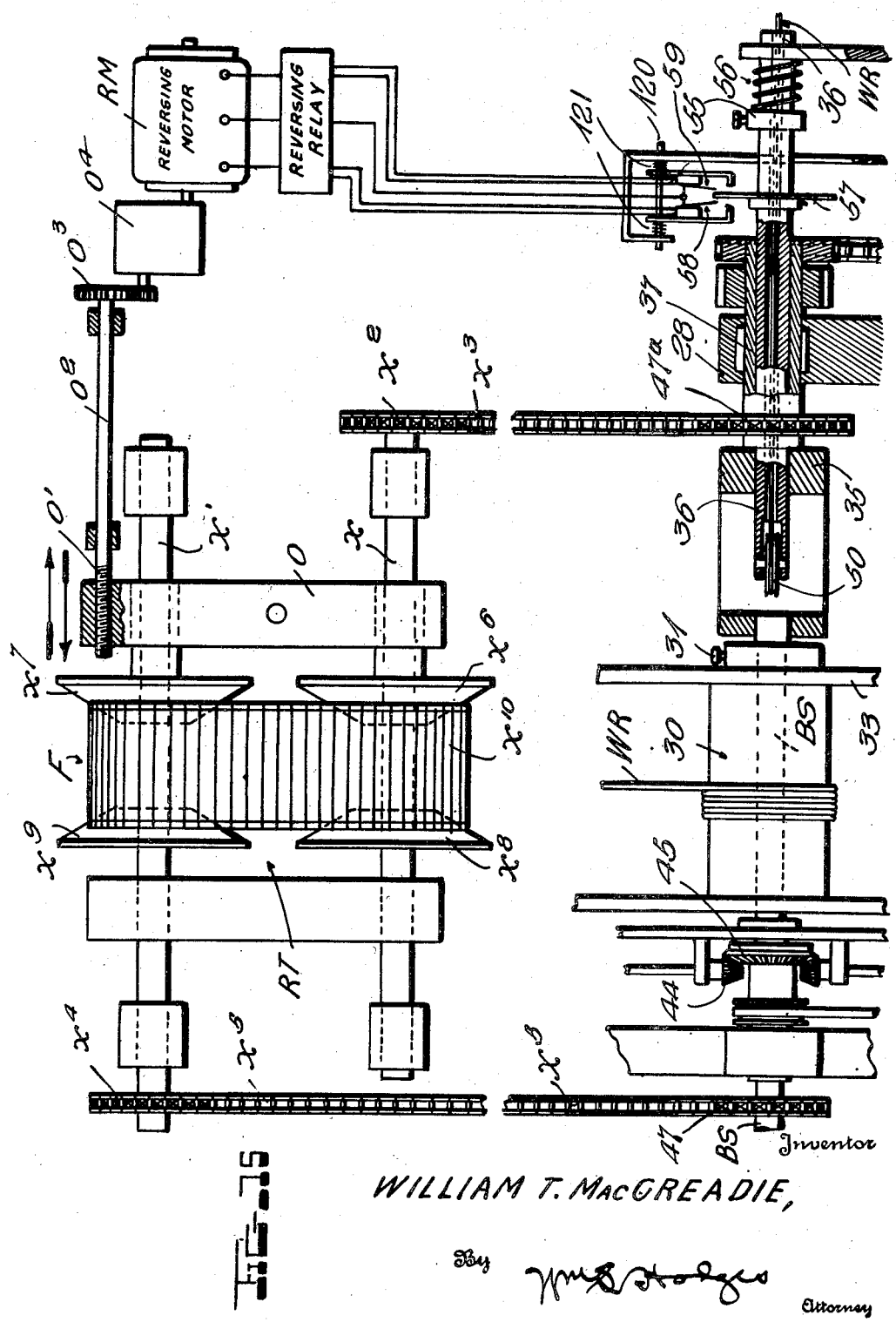
Inventor
WILLIAM T. MacGREADIE,
By Wm S Hodges
Attorney Patented Oct. 11, 1949

2,484,178

UNITED STATES PATENT OFFICE 2,484,178

WIRE ROPE MAKING MACHINE

William T. MacCreadie, Lewisburg, Pa., assignor, by mesne assignments, to Sunbury Wire Rope Manufacturing Company, Sunbury, Pa., a corporation of Pennsylvania Application September 25, 1945, Serial No. 618,443

15 Claims. (Cl. 57—71)

This invention is a machine for manufacturing wire rope or cable of the type in which a plurality of wire strands are wrapped around or twisted about a central core-wire strand.

One of the objects of the invention is to provide a wire rope making machine of the character referred to, which will be entirely automatic in its operation, and so constructed and arranged that a single attendant may operate a plurality of the machines simultaneously.

A further object of the invention is to provide a wire rope making machine which will require less space for installation and operation than is possible for the installation and operation of wire rope machines of the gravity type.

An additional object of the invention is to provide simple means for guiding and controlling the delivery of the finished rope to a wind-up bobbin.

An important object of the invention is to provide means constructed and arranged to be controlled by movement of the completed rope during its travel from the haul-off unit to the wind-up bobbin, for automatically maintaining a predetermined tension on the rope as it is fed to the wind-up bobbin, and to also control the speed of rotation of said bobbin.

Another object of the invention is to provide means for automatically recording the length of the completed rope.

It is also an object of the invention to provide means for synchronously operating the strand-wire-feed units, the haul-off unit, the twister die unit, the wind-up bobbin unit, and the feed control for the latter from a single source of power applied directly to the haul-off unit.

The invention will be hereinafter fully set forth and particularly pointed out in the claims.

In the accompanying drawings:

Figure 1 is a fragmentary side elevation illustrating the wind-up unit of the machine, Figure 2 is a similar view of the haul-off and transmission control units, Figure 3 is also a similar view illustrating the measuring unit and the wire-strand-feeding units, Figures 4, 5 and 6 are top plan views of the respective units illustrated in Figures 1, 2 and 3, Figure 7 is a longitudinal sectional view slightly enlarged, illustrating the mounting at one end of the wind-up bobbin, Figure 8 is an enlarged sectional view illustrating the mounting at the other end of the wind-up bobbin, as well as the transmission control, and means for transmitting power from the haul-off unit, Figure 9 is a detail fragmentary view illustrating the mounting for the guide pulley which delivers the completed rope to the wind-up drum, Figure 10 is an enlarged front elevation and Figure 11 is a top plan view illustrating the epicyclic gearing which actuates and controls the mechanism for guiding the completed wire rope to the wind-up bobbin, Figure 12 is a side elevation partly in section illustrating the rope measuring mechanism, Figure 13 is a top plan view thereof.

Figure 14 is an enlarged detail sectional view illustrating the gearing for actuating the registering mechanism, Figure 15 is a plan view, partly in section, illustrating the speed control transmission and its relationship to the wind-up mechanism.

Referring to the drawings, the wire rope making apparatus of the present invention comprises a battery of outside-wire-strand-supply bobbins A, a center or core-wire-supply bobbin unit B, a twisting die unit C, a haul-off unit D, an emergency brake mechanism E, an automatic speed transmission control unit F and a wind-up bobbin unit G. In practice these several units are operatively associated together to provide a practicable assembly of wire-rope-manufacturing units, which are usually arranged in longitudinal alignment and operated in a coordinated manner by means to be later described in detail. In this connection, it is to be understood that in order to adequately illustrate the novel features of the invention they are here shown in disconnected views sufficiently large to delineate them, and that all of the above identified units are included in each of two series of figures, namely Figures 1, 2 and 3 and Figures 4, 5 and 6, respectively, and that all of the figures of each of these series are to be considered as having been positioned in longitudinal alignment from left to right, in the order named in the series, and that they are so arranged that they may all be operated simultaneously. The general plan of operation of the assembly of units is that the wire strands supplied by units A and B are delivered to the twisting die unit C, and the completed cable rope WR is drawn through the die by the operation of the haul-off unit D. From the last mentioned unit the rope WR is delivered to the wind-up bobbin unit G, where it is wound upon a bobbin for future use, and from which it may be dispensed in the usual and well known manner.

In practice, the units A and B may be of any desired construction, but it is preferred to employ the wire bobbin feeding arrangement disclosed in Letters Patent No. 2,360,783 dated October 17, 1944. It is to be understood that any preferred number of outside-wire-strands may be employed in the manufacture of a wire rope in accordance with the present invention, depending upon the desired strength of the finished cable, but for purposes of illustration, and without intending to limit the invention in this particular, six outside-wire-feeding devices are provided. Each feeding device comprises a bobbin $a$, rotatively mounted in a cradle $a'$, which latter is provided with oppositely extended, axially disposed shafts $a^2$ and $a^3$, respectively, which are rotatively mounted in bearings $a^4$. Each bobbin $a$ is mounted to rotate upon an axis at right angles to axis of rotation of its cradle, and each shaft $a^2$ is made hollow to permit the wire strand $w$ delivered by the bobbin $a$ associated therewith, to travel therethrough. The several wire strands $w$ are caused to converge as they leave the cradles $a^2$, and to pass through a guide frame GF in a well-known manner to and through the twisting die TD in the usual way. To prevent a too rapid unwinding of the bobbins $a$, each of the cradles $a'$ may be provided with a tension device T. These may be of any desired construction, but it is preferred to employ the form illustrated in said Letters Patent No. 2,360,783.

The center or core-wire bobbin $b$ is also rotatively mounted in a cradle $b'$, which is also provided with oppositely disposed, axially projected shafts $b^2$ and $b^3$ at its ends and which are rotatively mounted in bearings $b^4$. The bobbin $b$ is mounted to rotate on an axis at right angles to the axis of rotation of the cradle $b'$, and the wire strand $w'$ is delivered from the bobbin through the hollow shaft $b^2$, and then caused to pass through the guide frame GF to the die TD. It is preferred to effect simultaneous rotation of the cradles $a'$ in coordination with the rotation of cradle $b'$, and it is desirable to do this in the manner illustrated in the above identified patent, i. e. to provide mechanism actuated by rotation of the cradle $b'$ for imparting synchronous rotations to all of the cradles $a'$. For this purpose the pulley $b^5$ by means of a belt $b^7$ drives the pulley $a^5$ of the next adjacent cradle $a'$, i. e. the first one immediately above the pulley $b^5$ as viewed in Figure 3. The shaft $a^2$ of the last mentioned cradle is also provided with a second pulley $a^6$ which is connected by a belt $a^7$ with the pulley $a^8$ on the shaft $a^2$ of the next adjacent outermost cradle. A second pulley $a^9$ carried by the last mentioned shaft $a^2$ is connected with a pulley $a^{11}$ on the shaft $a^2$ of the topmost cradle $a'$, as viewed in said figure. In the same manner the pulley $b^6$ through the medium of a belt $b^7$ drives the remaining cradles $a'$—the lower ones as viewed in Figure 3—the belt and pulley arrangement being a duplication of that above described.

The wind-up bobbin unit G will now be described. Referring particularly to Figures 1, 4, 7 and 8, a frame of any desired construction is provided, but preferably constructed with transverse bars 21, 22 and 23 respectively, having upright members 24, 25 and 26, respectively. These uprights serve to support bearings 27, 28 and 29, respectively. The wind-up bobbin WB is in the form of a cylindrical drum 30, provided with an end flange, said drum having an axial bore through which extends a bobbin shaft BS. Said bobbin is connected to rotate with said shaft by suitable means, a set screw 31 extending through a hub of said bobbin and engageable with the shaft, being shown for this purpose. One end of the shaft BS terminates adjacent the location of said set screw and extends into and engages a side bar 32 of a wind-up bobbin cradle WC. The other end of said shaft extends through the opposite side bar 33 of said cradle, and also through bearing 27 to a position beyond the latter.

Extending axially beyond the side bar 33, and in a manner to enclose shaft BS, is a short tubular shaft 34, one end thereof being connected to said side bar 33 and the other end being rotatively mounted in the bearing 27, said bearing preferably being of the ball or roller bearing type. The side member 32 of the wind-up bobbin cradle is provided with an auxiliary bearing frame 35, in which an axially disposed shaft 36 is slidingly mounted, but held from relative rotation in any desired manner. The outer portion of the shaft 36 extends through and is slidingly mounted within and rotatable with a tubular shaft 37, which in turn is rotatively mounted in the bearing 28.

Rotatively mounted in one side of the cradle WC is a screw-threaded feed shaft 40 on which is mounted a traveller-guide-block 41 for "laying" the completed rope or cable WR along the drum 30 during the winding operations of the latter. A guide pulley $41^a$ for the cable is mounted on said block 41. In order to counterbalance the weight of the shaft 40 and guide block 41, a similar shaft $40^a$ and a dummy block $41^b$ are mounted in the opposite end of the cradle. The shafts 40 and $40^a$ are each provided with a bevel pinion 42 at one side. Each of these pinions mesh with a complemental pinion $42^a$ on a radially disposed counter shaft 43. There are two oppositely disposed counter shafts 43, and they are respectively provided with other pinions 44 which mesh with a master drive gear 45, rotatively mounted on the shaft 34. Said drive gear 45 is rotated by suitable means such as a sprocket wheel 46 for instance, which is secured to the hub of said gear 45, said sprocket wheel 46 being driven by an automatically controlled epicyclic unit to be later described in detail. The shaft BS is provided with a driving sprocket wheel 47 and the shaft 37 is provided with a sprocket wheel $47^a$. Said shaft BS is also provided with an emergency brake 48, which may be controlled in any desired manner, but preferably by electromagnetic means indicated at 49.

The control shaft 36 is provided with an axial bore for the passage therethrough of the completed rope WR delivered from the haul-off unit, and a tension pulley 50 is mounted on and rotatable with the inner end of the shaft 36, opposite the end of said bore. The completed wire rope WR is passed around said guide pulley 50, over a second tension pulley 51 and from the latter over a guide pulley 52, and then through the guiding pulley $41^a$ of the guide block 41. From the last mentioned pulley the rope is fed to the bobbin WB, so as to be wound upon the latter. The outer end of the shaft 36 extends beyond the outer end of the tubular shaft 37, and is rotatively mounted in a supplemental bearing 54. Adjustably connected with said shaft 36 so as to be movable therewith is an abutment member 55, which limits the expansion of a compression spring 56, interposed between said abutment and the bearing 54. Also secured in suitable manner to said shaft 36 is a movable contact member 57, so positioned as to operate between and in conjunction with contact members 58 and 59 which control the circuits to a reversing motor and relay RM. Said motor serves to automatically control any desired type of speed control transmission. An electrically controlled Reeves type transmission RT has been selected for the purposes of illustration and without intent to limit the invention thereto, it being understood that other types of control of such a transmission are well-known in the art. As shown, said transmission is provided with a driving shaft $x$ and a driven shaft $x'$ mounted in suitable bearings and in parallel relationship and operatively connected by any desired form of intermediate transmission mechanism. For purposes of illustration and without intending to limit the invention in this respect, a common form of belt and pulley transmission is shown in the drawings. In this type the driving shaft $x$ is rotated by means of a sprocket wheel $x^2$ which in turn is driven by a chain $x^3$ from a sprocket wheel 47$^a$ on the shaft 37. The driven shaft $x'$ is provided with a sprocket wheel $x^4$ which is connected to the sprocket wheel 47 on the shaft BS by means of a chain $x^5$. Mounted on the respective shafts $x$ and $x'$, so as to rotate therewith are the fixed cone pulleys $x^8$ and $x^9$. Slidingly mounted on the respective shafts $x$ and $x'$ are the adjustable cone pulleys $x^6$ and $x^7$. The pulley $x^8$ is complemental to the pulley $x^6$ and the pulley $x^9$ is complemental to the pulley $x^7$. The usual belt $x^{10}$ engages said pulleys in driving relationship. The pulleys $x^6$ and $x^7$ are shiftable with respect to their complemental pulleys $x^8$ and $x^9$ by means of a rocker arm $o$, pivotally supported in suitable manner adjacent said pulleys, one end of said rocker arm having a screw threaded engagement with a correspondingly threaded portion $o'$ of a control shaft $o^2$. Said shaft $o^2$ is rotated by means of gearing $o^3$ driven from a gear reduction box $o^4$ connected with the driving shaft of the motor RM.

The arrangement of the Reeves transmission and the contact members 57, 58 and 59 is such that when the rocker arm $o$ is in neutral position, the sprocket wheel 47 is driven at the same speed as sprocket wheel 47$^a$ on the shaft 37. Also the motor RM remains neutral. However, when the motor RM is selectively actuated by closing either circuit through contacts 58 and 59, the screw shaft $o^2$ will be correspondingly rotated, so as to concurrently move the rocker arm $o$, resulting in a change of speed of shaft $x$. By this means the contact 57 may be yieldingly set in an initial neutral position between the contacts 58 and 59. If, however, the speed of rotation of the sprocket wheel 47 should exceed the commensurate capacity of the haul-off drum unit D to supply the completed rope, the tightening of the travelling rope will cause the shaft 36 to move in a direction to increase the tension upon the spring 56, so as to cause contact 57 to engage the contact 59. This will energize the motor and relay RM and cause it to rotate the shaft $o^2$ in a direction to actuate the rocker arm $o$ so as to move the cone $x^6$ toward the cone $x^8$ and to move the cone $x^9$ away from the cone $x^7$, thereby reducing the speed of rotation transmitted from the shaft $x$ to the shaft $x'$. In a similar manner should the speed of rotation of the shaft BS be too slow, the tension maintained by the rope on shaft 36 is slackened, whereupon the spring 56 will move the contact 57 into engagement with contact 58. This will effect a reverse rotation of the motor RM to the shaft $o^2$, so that the latter will cause the rocker member to separate the cones $x^6$ and $x^8$ and to bring the cones $x^7$ and $x^9$ closer together, which will increase the speed of the driven shaft $x'$ and thereby increase the speed of rotation of sprocket wheel 47. Therefore, the shifting of the contact 57 between the contacts 58 and 59, so as to alternately engage the latter, will automatically maintain a proper speed differential between the sprocket wheels 47 and 47$^a$.

The epicyclic control for the wind-up bobbin WB comprises a shaft 70, which receives its power from the shaft 37 in suitable manner, such as by means of sprocket wheels 71 and 72, driven by a chain 73. Rotatively mounted in a frame member 21 is a sleeve 74 carrying a sprocket wheel 75 at one end and a bevel pinion 76 at its other end. The shaft 70 extends axially through said sleeve and the two are relatively rotatable. Secured to and rotatable with said shaft 70 is a carrier 77, from opposite sides of which project pins 78, carrying oppositely disposed rotatable bevel pinions 79 and 79$^a$, both of which are rotatable upon said pins 78 and in mesh with the pinion 76. Rotatively mounted in a suitable bearing 80 and in axial alignment with the sleeve 74 is a second sleeve 74$^a$ which is provided at one end with a bevel pinion 76$^a$ meshing with the pinions 79 and 79$^a$, and having a driving pinion 81 at its other end. The adjacent end of shaft 70 passes through the sleeve 74$^a$ in relatively rotative relationship. The pinion 81 is driven from a speed reduction transmission 82, which is actuated by a reversible motor and relay 83. Said pinion 81 is also in mesh with a drive pinion 84 secured to and rotatable with a screw-threaded shaft 85, which is rotatively mounted in suitable bearings 87. A movable contact member 88 is arranged to travel along said shaft 85 during rotation of the latter and in a well known manner, so as to alternately engage complemental contact members 89 and 89$^a$. The last mentioned contacts control the reversing circuits of the motor 83. In operation, the shaft 70 rotates within the sleeves 74 and 74$^a$ and causes the pinions 79 and 79$^a$ to travel in an orbit about the shaft while they are in mesh with the pinions 76 and 76$^a$. The motor transmission 82 normally operates the drive sleeve 74$^a$, which through the pinions 76$^a$, 79, 79$^a$ and 76, effect rotation of the sprocket wheel 46. The direction of rotation of the pinion 76$^a$ is changed at each end of the limit of travel of the contact 88. In this manner the threaded feed shafts 40 and 40$^a$ are driven concurrently, at the same speed and in the same direction. During operation of the machine sprocket wheel 46 usually rotates somewhat faster or somewhat slower than the shaft 34, while the guide block 41 is in operation, and this difference in the speeds of rotation is compensated for by the epicyclic unit, which insures a uniform movement of the guide block 41, regardless of variations in the speed of the machine. It is to be understood that the gearing ratios of the driving mechanism and the pitch ratios of the respective threads of the several screw threaded shafts are so proportioned as to operate said shafts in properly timed relationship.

The haul-off unit D includes a cradle $d$, which is provided at one end with an axially disposed tubular shaft $d'$, rotatively mounted in the bearing 29. Extending through the said tubular shaft is a central shaft $d^3$, which is disposed in longitudinal alignment with the shaft 36, but held against rotation by means of a bracket on bearing 54$^a$. Said shaft $d^3$ is also provided with an axial bore for the passage of the finished rope WR. The other end of the cradle is provided with an axially projected tubular shaft $d^4$, which is rotatably mounted in a bearing $d^5$.

The haul-off drum $d^6$ is mounted on and is rotatable with a transverse shaft $d^7$, which is rotatively supported in the cradle $d$. One end of said shaft $d^7$ is mounted in a bracket $d^8$ and is provided with a bevel pinion $d^9$ located adjacent said bracket. A longitudinally disposed drive shaft $d^{10}$ extends along one side of the cradle and is mounted in said bracket $d^8$ so as to be rotatively supported within the cradle. Slidingly mounted on the drive shaft $d^{10}$ and rotatable therewith is a sleeve $d^{11}$ which is provided with relatively spaced bevel pinions $d^{12}$ and $d^{13}$, which are positioned to be selectively engaged with the pinion $d^7$, by slidable adjustments of said sleeve $d^{11}$, so as to control the direction of rotation of the shaft $d^{10}$. Said sleeve $d^{11}$ may be shifted in any desirable manner. Fixedly secured to the shaft $d'$ at a position inside of the cradle is a drive gear $d^{14}$ which, through an intermediate gear train $d^{15}$, is connected with a drive pinion $d^{16}$ on the adjacent end of the drive shaft $d^{10}$, so that rotation of the cradle will impart simultaneous rotative movements to said drive shaft.

Rotation of the cradle $d$ is effected by means of a driving motor DM, the driving shaft of which is connected by means of a belt $h$. Said belt drives a pulley $h'$ secured to the shaft $d'$. Rotation of the entire machine may be arrested automatically by means of a brake band $h^2$ which engages a drum $h^3$ on the shaft $d'$, said brake being automatically controlled by a solenoid $h^4$. Such a braking arrangement is fully described and illustrated in said Letters Patent No. 2,360,783 hereinabove referred to, and inasmuch as no claim per se is being made to the braking arrangement, it is considered sufficient to conventionally illustrate the same. Fixedly secured to the shaft $d'$ is a gear $h^5$ which meshes with a pinion $h^6$ mounted upon a counter shaft $h^7$, the latter being supported in supplemental bearings $54^a$ and $54^b$. Also mounted on said counter shaft is another pinion $h^8$, which meshes with pinion $h^9$ on the shaft 37. By this arrangement power from the motor DM is transmitted to the wind-up bobbin unit G without interfering with the operations of the tension regulating mechanism.

Rotatively mounted on the shaft $d^4$ is a twister die TD, the bore of the die being in axial alignment with the bore of said shaft. The die is so connected with the shaft $d^4$ that it will be rotated concurrently with the rotative movements of the cradle $d$. The twister die unit may be of any well known construction and is illustrated conventionally. Also mounted on the shaft $d^4$ is a gear $b^7$ which meshes with a pinion $b^8$ on a counter shaft $b^9$. Said counter shaft is provided with a pinion $b^{10}$ which meshes with a pinion $b^{11}$ on shaft $b^2$ of the core wire bobbin cradle $b$. By means of this arrangement rotation of the cradle $b$ is effected by and in synchronism with rotative movement of the haul-off drum cradle.

If desired, an automatic measuring apparatus M may be interposed between the core-wire bobbin unit B and the twister die, so as to record the amount of wire $w'$, delivered by said unit, and thereby indicate the length of the completed rope, which last will tally with the amount of said wire $w'$ that passes through the machine.

Referring more particularly to Figures 12, 13 and 14, 90 designates a drive shaft which is releasably connected to and supported in suitable manner by the outer end of the hollow shaft $b^2$ of the bobbin cage $b'$. The other end of the shaft is secured to one end of a cage $m$. For purposes of illustration and without intent to limit the invention in this particular, said shaft $b^2$ of a wire feeding bobbin device, which has an axial bore for passage of a wire strand $w'$, is provided with an internally threaded axial recess 91 in register with its bore, to receive the exteriorly threaded shank 92 of a coupling head 93. Said head and its shank are provided with an axial bore in alignment with the bore of the shaft $b^2$, and also with an internally threaded recess 94, which is detachably engaged by a reduced threaded portion 95 on the end of the shaft 90. Said shaft 90 is also provided with an axial bore in alignment with the bore of the shaft $b^2$. The other end of the cage $m$ is rotatively supported by a shaft 96 also provided with an axial bore 97 and rotatively supported by a bearing 98.

Rotatively mounted on the shaft 90 is a sleeve 99, to which is secured a carrier piece 100, so as to rotate therewith, and rotatively mounted in said carrier piece, at diametrically opposite positions, are two bevel pinions 101 and 101ª. Mounted on the other end of the sleeve 99 and rotatable therewith is a gear 102, which is driven by a gear 103 mounted on and rotatable with the shaft 90, through the medium of transmission gears 104 and 104ª suitably supported in relation thereto.

Also rotatively mounted on the shaft 90, at a position adjacent one end of the cage $m$ is the hub 105 of a bevel pinion 106, which is in mesh with the pinions 101 and 101ª. A pinion 107 is mounted on and rotatable with said hub 105, said pinion 107 being in mesh with a driving pinion 108, carried by one end of a counter shaft 109 which is rotatively mounted in bearings 110 supported on the outer side of cage $m$. A bevel pinion 111 is secured to the other end of said counter shaft in a position to mesh with a complemental pinion 112, carried by a cross shaft 113. The last mentioned shaft is rotatively mounted transversely of the cage $m$, and carries a measuring drum MD, which is rotatable therewith.

Rotatively mounted on the sleeve 99 is the hub 114 of a bevel gear 115, which latter is in constant mesh with the pinions 101 and 101ª. Also secured to said hub 114 is the registering-mechanism-drive pinion 116, which is operatively connected with the pinion 43 on the driving shaft of a counter and registering mechanism R, through the medium of intervening gearing.

In practice, the work to be measured, which in the present instance is the wire $w'$, is caused to travel axially from the shaft $b^2$ through the shaft 90 into the cage $m$, under the guide pulley 117, over the drum MD, beneath the guide pulley 118, and finally out through the bore of the shaft 96. During such travel the shaft 90 is constantly rotated by the cage $b'$. As the work passes over the periphery of the drum D, the latter is caused to rotate, thereby causing the intervening transmission elements carried by the cage to effect rotation of the hub 105. Said driven rotative movements of hub 105, through the medium of the pinions 106, 101 and 101ª, impart corresponding rotative movements to the pinion 115, thereby effecting proportionate rotative movement to the pinion 116. The various gears and transmission mechanism intervening between the drum MD and the pinion 116, are so proportioned and the registering mechanism is so calibrated as to register predetermined linear increments of measurement of the work which passes over the drum. In this application no claim per se is made to the above described measuring mechanism. If it should be found desirable to omit the counting unit from the wire rope making mechanism, the bobbin unit B may be arranged to deliver directly to the twisting die in the manner disclosed in said previously mentioned patent.

From the foregoing description, it will be readily understood that rotative movements are imparted to the haul-off drum cradle $d$ by the motor DM through the belt $h$ and pulley $h'$ and that all rotative elements are driven by and in coordination with the rotative movements of said cradle. For instance, the twister die is rotated by the shaft $d^2$, and the core wire unit is rotated through the gears $b^7$, $b^8$, counter shaft $b^9$ and gears $b^{10}$ and $b^{11}$, which by-pass the measuring unit. The rotation of the cradle $b'$ through the belt and pulley connections impart simultaneous and correlated rotations to the cradles $a'$, so that the core wire is fed to the twister head and the cover wires are arranged to converge to the twister head and to be twisted or wrapped around the core wire during its passage through the machine. Rotation of the cradle $d$ imparts rotative movements to the haul-off drum $d^6$ through the medium of the gears $d^{14}$, $d^{15}$, shaft $d^{10}$ and pinions $d^9$ and $d^{12}$ or $d^{13}$. The shaft 37 is rotated from the shaft $d'$ by means of the gears $h^5$, $h^6$, counter shaft $h^7$ and gears $h^8$ and $h^9$ and by means of this connection the cradle of the wind-up bobbin is also rotated. Concurrently the Reeves transmission is operated by the sprocket wheel 47$^b$ and belt $x^3$ so that the said transmission through the sprocket wheel 47 will actuate the threaded screws for guiding the finished rope to the bobbin, said bobbin being also rotated concurrently with the rotation of the cradle. Likewise, by means of the shaft 70 which is operated from sprocket wheel 71, the epicyclic gearing which controls the concurrent rotation of the shafts 40 and 40$^a$ is also operated in synchronism with the other movements.

In operation, the core wire $w'$ from the bobbin $b$ is passed through the hollow shaft $b^2$ of its cradle, through the guide frame GF and finally through the twister head TR. The cover wires $w$ are also simultaneously drawn from their bobbins $a$ through the hollow shafts $a^2$ of their cradles, and from there through the guide frame GF and then into and through the die TR. In the initial set-up of the machine a suitable cable is spliced or otherwise secured to the end of the wires which protrude from the twister die, said cable being passed several times around the haul-off drum $d^6$, so that the completed rope may be drawn through the die when the motor DM is energized. When sufficient rope has been made to reach the wind-up drum the cable is detached as the machine is then ready for continuous operation. As the completed cable is drawn through the die by the drum $d^6$ it is passed through the bore of the shaft 36 and then around the pulleys 50, 51, 52 and 41$^a$ to be engaged with the wind-up bobbin WB. It is preferred to have the pulley 41$^a$ initially at one extreme of its travel on the shaft 40. Thereupon, as the bobbin WB is rotated, the epicyclic gears set the shafts 40 and 40$^a$ in motion so that the pulley 41$^a$ will be caused to intermittently travel back and forth over a course parallel with the bobbin so as to lay the rope evenly along the bobbin, the distance of travel in either direction being determined by the relative spacing of the contacts 89 and 89$^a$. During these movements the transmission F through the electrical control of the motor RM so controls the speed of rotation of the shaft 40 as to maintain a proper tension on the completed rope during the time that it is being fed to the drum. If desired, a brake 48 may be employed to assist the arresting of the winding bobbin cradle and the bobbin carried thereby, although the transmission F may possess sufficient sturdiness to take care of this emergency. When it is desired to stop the operation of the machine altogether, the brake $h^2$ may be utilized in a well known manner.

The advantages of the invention will be readily understood by those skilled in the art to which it belongs. For instance, it will be observed that a very simple form of wire rope manufacturing machine is provided which by reason of the disposition of the wire supplying units will require much less space for installation and operation than is possible for the installation and operation of wire rope machines of the gravity type which requires a rather lengthy tandem arrangement of the bobbins. Another important advantage is that simple and efficient means have been provided for guiding and controlling the delivery of the finished rope from the haul-off drum to the wind-up bobbin, together with means for automatically maintaining a predetermined speed ratio between the feed of the completed rope from the haul-off drum and the speed of delivery of the completed rope to the wind-up bobbin. It will also be noted that if desired a rope measuring unit may be placed within the operated layout, the same being so arranged as to be operated by rotative movements of the core wire bobbin cradle $b'$. A further advantage is that any wind-up bobbin WB may be readily taken out for replacement by removing the shaft BS. A very important advantage is that the wind-up bobbin may be made of any desired length, without increasing its diameter, as may be necessary to compensate for any loss of capacity to receive the completed rope, which might otherwise arise if for any reason the diameter of the drum should have to be reduced. Another advantage is that by reason of the employment of a transmission of the Reeves type, necessity of employing friction clutches is completely avoided.

Having thus explained the nature of the invention and described an operative manner of constructing and using the same, although without attempting to set forth all of the forms in which it may be made, or all of the forms of its use, what is claimed is:

1. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said bobbin shaft, a drive gear rotatively mounted upon and arranged concentrically with respect to the bobbin shaft, an actuator shaft mounted in said cradle, a rope-guide-member mounted to be reciprocated by said actuator shaft, so as to deliver rope to said bobbin, a counter shaft operatively connecting said drive gear and said actuator shaft, means for counterbalancing said guide member, means for imparting independent rotative movements to said drive gear, and means for controlling the speed of rotation of said drive gear.

2. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said bobbin shaft, a drive gear rotatively mounted independently of said cradle and in concentric relation with respect to the bobbin shaft, means independent of said bobbin shaft rotating means for rotating said drive, an epicyclic unit gear for controlling the speed of rotation of said gear, and means for operating said epicyclic unit so as to produce reciprocative movements of the rope guiding member.

3. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said bobbin shaft, a drive gear rotatively mounted upon and in concentric relation with respect to the bobbin shaft, means independent of said bobbin shaft rotating means for rotating said drive, an epicyclic unit gear for controlling the speed of rotation of said gear, means operated by said epicyclic unit for imparting rotative movements to said drive gear, and means for operating said epicyclic unit independently of the rotation of said bobbin shaft.

4. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said bobbin shaft, oppositely disposed actuator shafts rotatively mounted in said cradle and arranged in parallel relationship, a rope-guide-member reciprocatively operated by one of said actuator shafts, a counterbalance member reciprocatively operated by the other actuator shaft, a drive gear rotatively mounted upon and concentric with said bobbin shaft, means operated by said drive gear for imparting simultaneous rotative movements to said actuator shafts and in the same direction, means for controlling the speed of rotation of said drive gear, and means associated with said speed control means for automatically and intermittently reversing the rotative movements of said actuator shafts, so as to correspondingly change the direction of travel of said guide and counterbalance members.

5. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, a speed control transmission, means for driving said transmission, means for transmitting power from said transmission to said shaft, and means engaged by the rope and governed by the tension thereof during its travel to said bobbin for controlling the operation of said transmission.

6. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said shaft, means for delivering the rope to said bobbin, an axially disposed shaft having axially sliding engagement with said cradle and having means engageable with the rope during its travel to said bobbin, so that sliding adjustments are imparted to the slidable shaft in response to changes of tension on said rope, and means operated by sliding movements of said slidable shaft for controlling the speed of rotation of said bobbin shaft.

7. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said shaft, means for delivering the rope to said bobbin, an axially disposed shaft having axially sliding engagement with said cradle, a guide pulley rotatively supported by said slidable shaft and engageable with the rope during its travel to said bobbin, so as to impart slidable movements to said slidable shaft in response to changes in the tension on said rope, and means operated by sliding movements of said slidable shaft for controlling the speed of rotation of said bobbin shaft.

8. In a machine for manufacturing wire rope, a wind-up bobbin unit comprising a bobbin cradle, means for pivotally supporting said cradle, a wind-up bobbin shaft rotatively mounted in the cradle, a bobbin carrier by said shaft and rotatable therewith, means for rotating said shaft, means for delivering the rope to said bobbin, a slidingly supported shaft arranged axially with respect to said cradle, a guide pulley carried by said slidable shaft in a position to be engaged by the rope during its travel to the bobbin, so as to impart sliding movements to the shaft in response to changes in the tension on said rope, a variable speed transmission unit for controlling the speed of rotation of said bobbin shaft, means for transmitting power to said transmission unit, means for transmitting power from said transmission unit to said bobbin shaft, and means operated by sliding movement of said slidable shaft for controlling the operations of said transmission unit.

9. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said shaft, means for delivering the rope to said bobbin, an axially disposed shaft having sliding engagement with said cradle, a guide pulley carried by said slidable shaft in a position to be engaged by the rope during its travel to the bobbin, so that sliding movement will be imparted to said shaft by changes in tension of said rope, a variable speed transmission unit for controlling the speed of the bobbin shaft, means for transmitting power thereto, means for connecting said transmission unit with said bobbin shaft, a reversible motor controlling the operations of said transmission unit, and means operated by sliding movements of said slidable shaft for controlling the direction of operation of said motor.

10. In a machine for manufacturing wire rope, a wind-up bobbin unit comprising a bobbin cradle, means for pivotally supporting said cradle, a wind-up bobbin shaft rotatively mounted in the cradle, a bobbin carried by said shaft and rotatable therewith, means for rotating said shaft, means for delivering the rope to said bobbin, an axially disposed shaft having sliding engagement with said cradle, a guide pulley carried by said slidable shaft in a position to be engaged by the rope during its travel to the bobbin, a variable speed transmission unit for controlling direction and speed of rotation of the bobbin shaft, means for supplying power to said transmission unit, means for transmitting power from said unit to said bobbin shaft, a reversing motor for controlling the direction of rotation of said transmission, said motor having oppositely disposed contacts to control the direction of rotation thereof, a contact on said slidable shaft complemental to said first mentioned contacts, a spring yieldingly biasing said slidable shaft to a predetermined position, and means controlled by the rope during its travel to said bobbin for moving said shaft against the tension of said spring, so as to selectively engage said motor contacts.

11. A wire rope manufacturing machine of the character described having in combination a wire twisting die, a haul-off unit so connected with said die as to rotate the same, means for rotating said haul-off unit on an axis corresponding to the axis of rotation of said die, a wind-up bobbin cradle, a bobbin mounted therein, an axially disposed slidingly supported shaft engaging said cradle and having means for engaging the rope during its travel to the bobbin, means operated by rotation of said haul-off unit for rotating said bobbin, a transmission unit for regulating the speed and direction of rotation of said bobbin shaft, and means controlled by said slidable shaft for controlling operations of said transmission unit.

12. A wire rope manufacturing machine of the character described having in combination a wire twisting die, a haul-off unit so connected with said die as to rotate the same, means for rotating said haul-off unit on an axis corresponding to the axis of rotation of said die, a wind-up bobbin cradle, a bobbin mounted therein, a slidingly supported, axially disposed shaft engaging said cradle and having means for engaging the rope during its travel to the bobbin, means operated by rotation of said haul-off unit for rotating said bobbin, a transmission unit for regulating the speed and direction of rotation of said bobbin shaft, means for driving said transmission unit, means operated by rotative movements of said haul-off unit for driving said transmission unit, means providing a driving connection between said transmission unit and said bobbin shaft, and means actuated by sliding movements of the slidable shaft for controlling the operations of said transmission unit.

13. A wire rope manufacturing machine of the character described having in combination a wire twisting die, a haul-off unit so connected with said die as to rotate the same, means for rotating said haul-off unit on an axis corresponding to the axis of rotation of said die, a wind-up bobbin cradle, a bobbin rotatively mounted therein, a slidingly supported shaft engaging said cradle and having means for engaging the rope during its travel to the bobbin, means operated by rotation of said haul-off unit for rotating said bobbin, a transmission unit for regulating the speed and direction of rotation of said bobbin shaft, means operated by rotative movements of said haul-off unit for driving said transmission unit, means providing a driving connection between said transmission unit and said bobbin shaft, a reversible motor for controlling the direction of rotation of said transmission, said motor having relatively spaced contacts for controlling said direction of its rotation, a contact carried by said slidable shaft and so positioned as to selectively engage either of said motor contacts, and a spring yieldingly acting upon said shaft so as to normally hold said shaft contact in neutral position with respect to said motor contacts.

14. A wire rope manufacturing machine of the character described having in combination a twister die, a haul-off unit, so connected with said twister die as to rotate the latter, means for rotating said haul-off unit on an axis corresponding to the axis of rotation of said die, means for feeding a core wire strand and a plurality of outside wire strands to said twister die, means connected with said haul-off unit for drawing the wire strands through said die, means interposed between the wire strand feeding bobbins and the twister die for engaging the core wire during its travel to said twister die, an indicator operated by said last mentioned core-wire-engaging means, and means actuated by rotative movement of the haul-off drum for also actuating said indicator operating means.

15. In a machine for manufacturing wire rope, a rotatable bobbin, means for rotating said bobbin, means for delivering rope to said bobbin, a longitudinally slidable shaft, said shaft movable in a direction toward or away from an end of said bobbin, means on said shaft engageable with said rope in its travel to said bobbin so that sliding adjustments are imparted to said slidable shaft in response to changes of tension on said rope, and means operated by sliding movements of said slidable shaft for controlling the speed of rotation of said bobbin.

WILLIAM T. MacCREADIE.

REFERENCES CITED

The following references are of record in the file of this patent:

UNITED STATES PATENTS

| Number | Name | Date |
| --- | --- | --- |
| 604,614 | Hansen | May 24, 1898 |
| 621,735 | Arnold | Mar. 21, 1899 |
| 1,427,667 | Whitcomb | Aug. 29, 1922 |
| 1,482,909 | Calkins | Feb. 5, 1924 |
| 1,981,083 | Somerville | Nov. 20, 1934 |
| 2,000,104 | Somerville | May 7, 1935 |
| 2,171,993 | Reichelt | Sept. 5, 1939 |
| 2,329,130 | Nelson et al. | Sept. 7, 1943 |
| 2,338,848 | Henning et al. | Jan. 11, 1944 |
| 2,360,783 | MacCreadie | Oct. 17, 1944 |

FOREIGN PATENTS

| Number | Country | Date |
| --- | --- | --- |
| 550,398 | France | 1922 |